March 17, 1936.　　　　C. R. MOON　　　　2,033,993
PROCESS OF STAMPING BLANKS
Original Filed April 27, 1934　　5 Sheets-Sheet 1
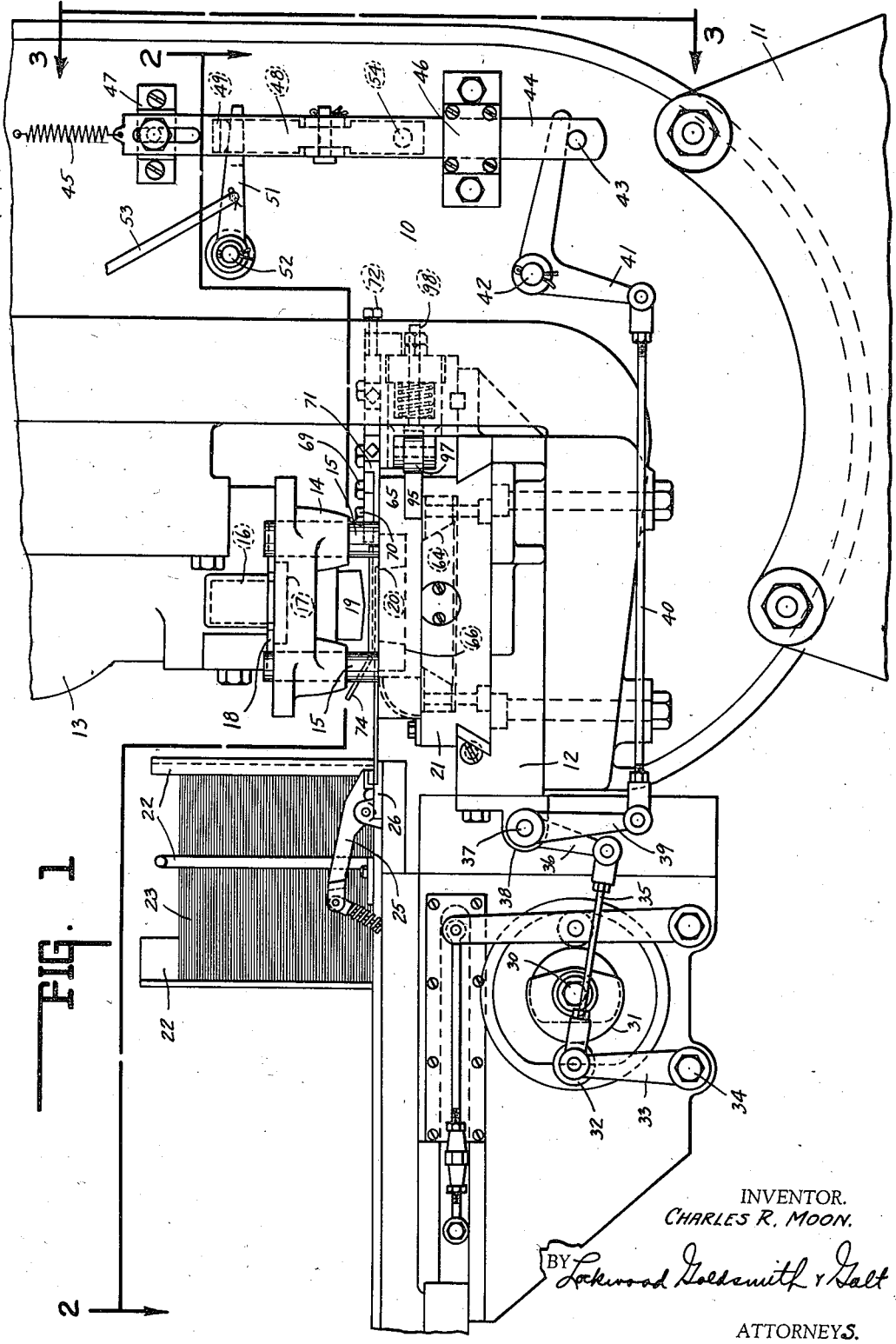
INVENTOR.
CHARLES R. MOON.
BY Lockwood Goldsmith & Galt
ATTORNEYS.

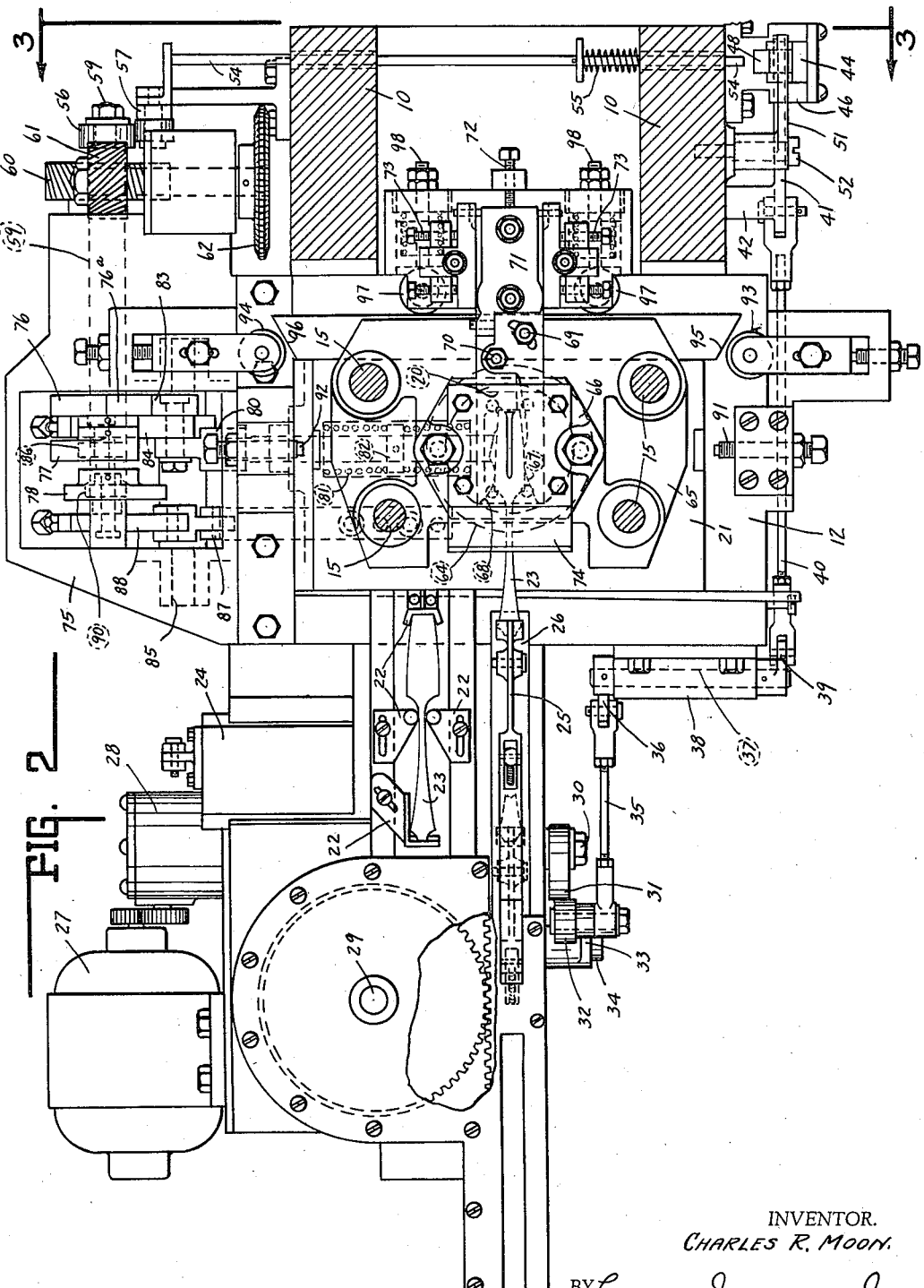

March 17, 1936.  C. R. MOON  2,033,993
PROCESS OF STAMPING BLANKS
Original Filed April 27, 1934  5 Sheets-Sheet 3
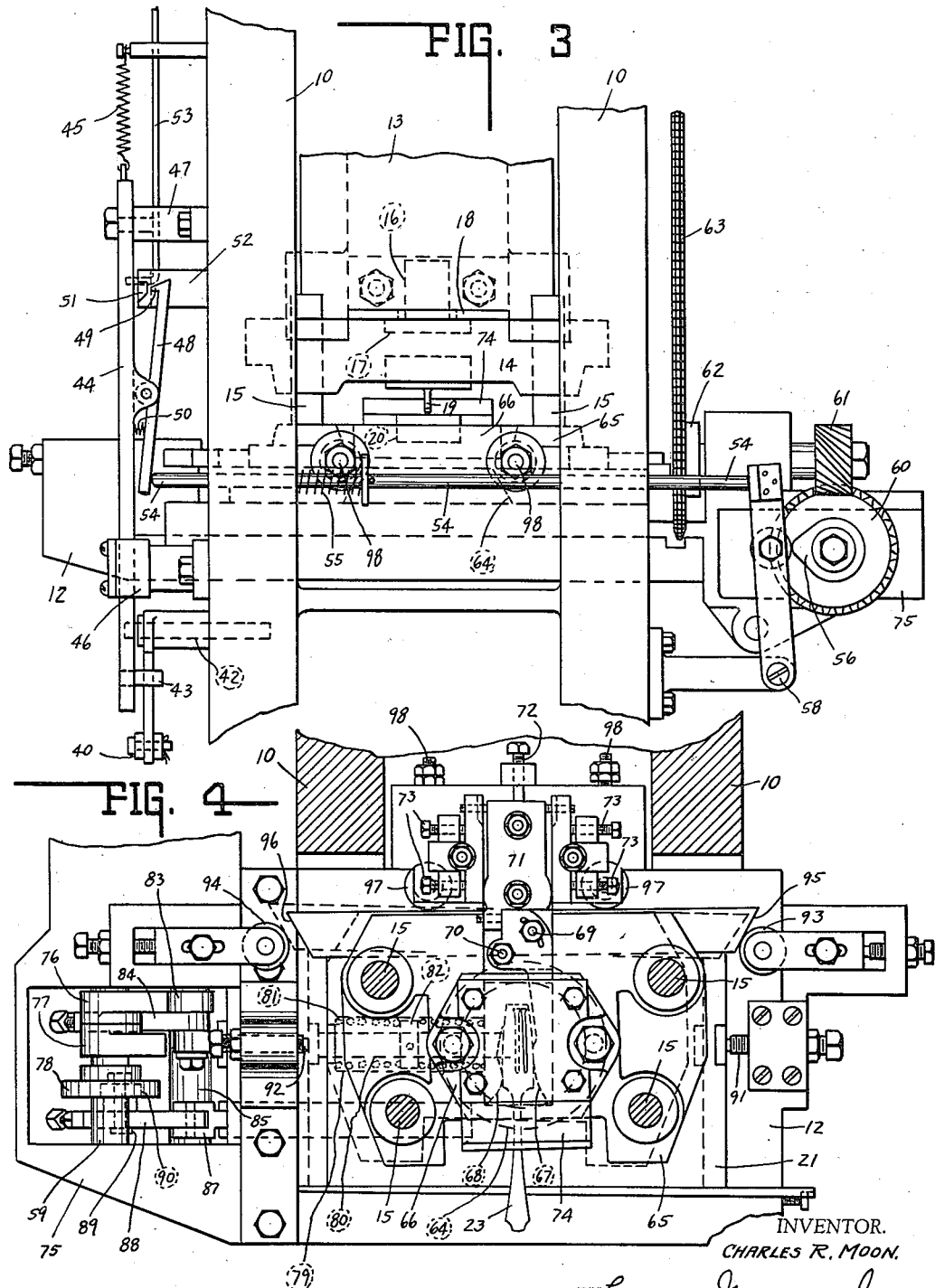
INVENTOR.
CHARLES R. MOON.
BY Lockwood Goldsmith & Galt
ATTORNEYS.

March 17, 1936.    C. R. MOON    2,033,993
PROCESS OF STAMPING BLANKS
Original Filed April 27, 1934    5 Sheets-Sheet 4
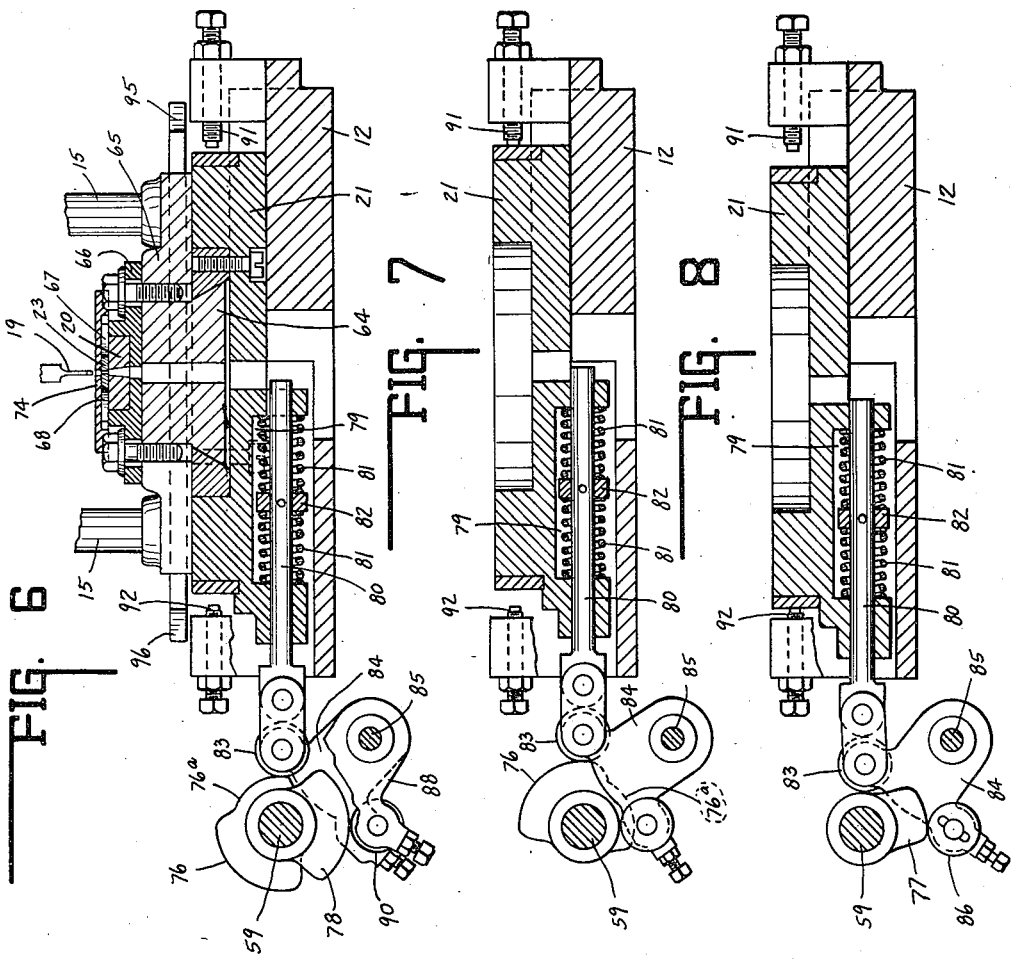
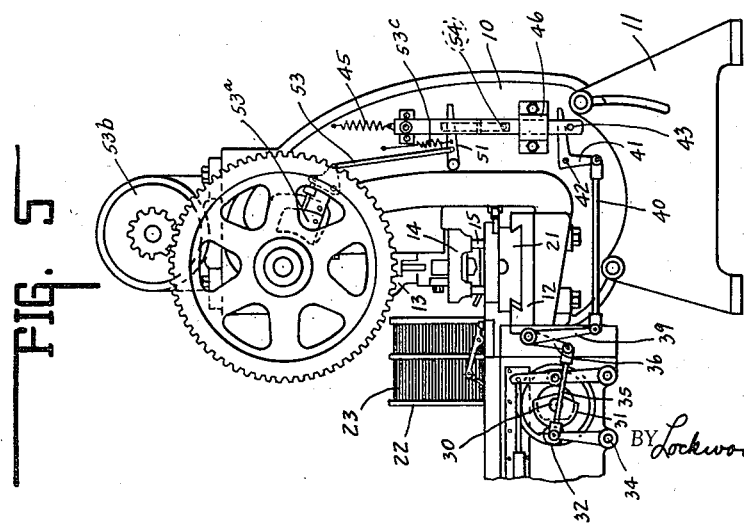
INVENTOR.
CHARLES R. MOON.
BY Lockwood Goldsmith & Galt
ATTORNEYS.

March 17, 1936.   C. R. MOON   2,033,993
PROCESS OF STAMPING BLANKS
Original Filed April 27, 1934   5 Sheets-Sheet 5
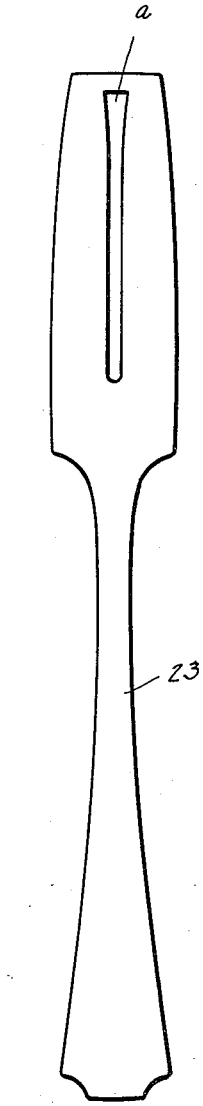
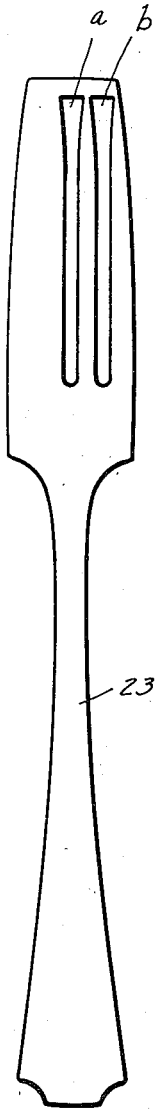
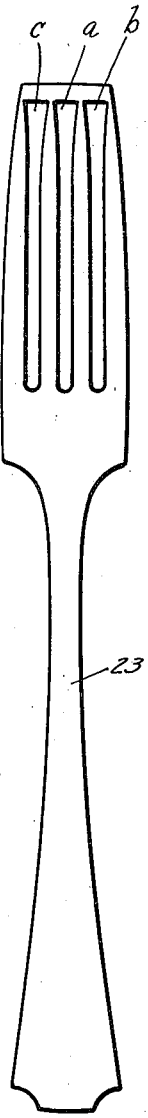
INVENTOR.
CHARLES R. MOON.
BY Lockwood Goldsmith & Galt
ATTORNEYS.

Patented Mar. 17, 1936

2,033,993

UNITED STATES PATENT OFFICE 2,033,993

PROCESS OF STAMPING BLANKS

Charles R. Moon, Muncie, Ind., assignor to Ontario Manufacturing Company, Muncie, Ind., a corporation Original application April 27, 1934, Serial No. 722,752, now Patent No. 2,021,461, dated November 19, 1935. Divided and this application August 11, 1934, Serial No. 739,360

6 Claims. (Cl. 76—105)

This invention relates to a process of stamping blanks, and particularly to stamping out tines of a table fork, being a division of application Serial No. 722,752, filed April 27, 1934, now Patent No. 2,021,461, Nov. 19, 1935, entitled Press for stamping blanks.

It is essential in forming the tines of a fork that they not only be accurately formed, but their ends be symmetrically tapered to form the sharpened points of the finished article. This requires great accuracy, both in the spacing and the angular relation of the dies with respect to the blank. Where a plurality of sets of dies are employed to simultaneously blank out the tines, difficulty is encountered in maintaining them in accurate relation, wherefore it is a substantial advantage, both in production of the dies and their maintenance, to employ only a single set of dies instead of a plurality of associated sets.

It is also difficult in using a plurality of sets of dies for simultaneous stamping to cause them to operate upon the blank accurately and without distortion of the tines, resulting from the strain and stress created in the blank by the simultaneous punching operations between the relatively thin tines.

In view of the above, the usual practice followed in producing forks is to feed the blanks by hand into a press having a pair of spaced sets of dies for stamping the outer openings adjacent the outer tines, leaving the inner tines connected. A second manual operation then takes place wherein the blank is fed to a press having a single set of dies which performs only the single operation of stamping the central opening between the two center tines.

It is the object of this invention to stamp all three openings in the blank with a single automatic feeding thereof by causing a relative movement between the blank and a single set of dies. This process may be accomplished on a fully automatic press which is capable of stamping spaces between all of the tines of the form with one automatic feeding thereof into the press while still avoiding the difficulties inherent in simultaneous stampings or the several feeding operations as above described. Thus, the blank is automatically fed to the press, and while held in position therein, all the tines are stamped out before the work is withdrawn from the press and discharged.

The main principle of the new process as herein set forth resides in the predetermined timed movement of a single die in respect to a fixed piece of work for stamping a plurality of openings therein progressively at different predetermined positions and at timed intervals. Thus, when applied to stamping out the tines of a fork, the fork is mechanically held rigid while the single die is caused to punch out the center space between the middle tines, then progressively moved to a new position for stamping out one of the side spaces, after which it jumps back over the central space and punches out the outer space on the other side thereof, as distinguished from the usual practice of having a die in fixed position while moving the work to different positions.

The automatic feeding of the blanks to the press forms no part of this invention, the same automatic feed being disclosed in my copending application Serial No. 678,641, filed July 1, 1933, now Patent No. 1,962,872, June 12, 1934, entitled Automatic feed for break-down machines.

The full nature of the invention will be understood from the accompanying drawings and the following description and claims:

In the drawings, Fig. 1 is a side elevation of the press feed, press operating control, and die blocks. Fig. 2 is a plan view of the press feed and a section through the press taken on the line 2—2 of Fig. 1. Fig. 3 is a view taken from the line 3—3 of Figs. 1 and 2, showing the rear elevation of a portion of the press. Fig. 4 is the same as a portion of Fig. 2, showing the dies in the extreme right-hand position in full lines and extreme left-hand position in dotted lines. Fig. 5 is a side elevation of the press showing the source of power and control mechanism with the press feed attached. Fig. 6 is a central horizontal section through the dies and control cams showing the dies in centered position. Fig. 7 is the same as Fig. 6 with parts omitted, showing the position of the die carrying slide plate in extreme right-hand position. Fig. 8 is the same as Fig. 7, showing the die carrying slide plate in extreme left-hand position. Figures 9, 10, and 11 illustrate the successive steps in the process of making a fork.

In the drawings there is illustrated a press of the type above mentioned having a frame 10 supported upon a base 11 provided with a bolster plate 12 and slide 13.

Whereas the usual press employs a male and female die rigidly locked to the slide and bolster plate respectively, they are herein movably mounted in the press as illustrated. To that end, the slide is provided with a male die head 14 vertically slidable upon the posts 15, but loosely mounted with respect to the slide 13 through the medium of a stud 16 having a depending head 17 upon which the head 14 is slidably supported through a cover plate 18. Thus, the head 14, which supports the male die 19, is raised and lowered by the slide 13 in the usual manner, but is free to move laterally in any direction by reason of its floating support as above described.

The posts 15 are rigid with the female die block 20 so the dies are held in accurate alignment during the operation of the press. However, the slide plate 21 is free to reciprocate laterally with respect to the bolster plate 12 upon which it is supported, as illustrated in full and dotted lines in Fig. 4.

The lateral movements of the dies are controlled in a manner hereinafter described within certain adjustable limits for moving them with respect to the work to progressively stamp the blank at different locations upon each press operation.

*Automatic feed*

The automatic feed for the blanks comprises a magazine 22 containing a plurality of blanks 23 in stacked relation. To one side thereof there is provided a feed plate 24 positioned to engage the lowermost blank of the stack and slide it from the bottom to position for engagement by the gripping lever 25 mounted on the reciprocating carriage 26. Said feed plate and carriage are driven by the motor 27 operating through a plurality of gears mounted in the gear housing 28 which act to rotate the shaft 29 and cam shaft 30. The feed plate 24 and carriage 26 are actuated thereby in the same manner as more specifically set forth and disclosed in the above-mentioned application, whereby the blank is periodically transferred from the magazine to the gripping lever and thereupon introduced into the press as illustrated in Figs. 1, 2, and 4.

After the blanking operation, the blank is then removed by the return movement of the carriage, which in its movement effects the release of the gripping lever to free the blank and permit it to drop from the machine. Feeding devices of this character are well known in the art, the particular one referred to herein being fully described in my copending application. As it forms no part of this invention, further reference thereto is not deemed necessary. However, the feeding device is operably connected with the press, in order that they may operate in timed relation in the following manner.

*Press operating control*

The shaft 30 carries a cam 31 acting upon a roller 32 supported upon the end of a lever 33 fulcrumed at 34. Connected with the lever 33 there is a connecting rod 35 having its other end pivoted to an arm 36, which is keyed to a shaft 37 mounted in a bearing 38 (Figs. 1 and 2). The other end of the shaft is keyed to an arm 39 pivotally connected with a rod 40, which in turn is connected with a bell crank lever 41 fulcrumed to the frame of the press at 42. The free end of the bell crank lever is in position to engage a pin 43 on the upright sliding bar 44 which is normally held in its upper position by a spring 45 and is slidably supported by the brackets 46 and 47 upon the frame 10 of the press.

On one side of the bar there is fulcrumed a latch 48 having a head 49 normally forced inward under tension of a spring 50 to engage an arm 51 fulcrumed to the frame 10 at 52. Pivotally connected with the arm 51 there is a rod 53 (Figs. 1 and 3), which operates the usual clutch commonly employed on this type of press, as indicated at 53a (Fig. 5).

The usual press of this character employs a foot-operated pedal for throwing the press into its driving relation with any suitable source of power 53b upon the pedal and rod being depressed or drawn down, while throwing out the clutch and applying a brake to stop the operation of the press by disconnecting it from the source of power upon the pedal being released and the rod elevated by a suitable spring 53c. The same action takes place herein, the parts being connected through said clutch with the source of power upon the rod 53 being drawn down by the arm 51 when depressed through the medium of the latch 48 and bar 44, operably connected, as above described, with the cam 31.

Thus, upon the feeding device positioning a blank in the press, the cam 31 thereof will, as above described, draw the rod 53 downwardly, causing the operation of the press on the blank positioned therein.

The clutch is released for disconnecting the press from the source of power by disengaging the head 49 of the latch 48 from the arm 51, as shown in Fig. 3. This permits the spring 53c to raise the rod 53 for releasing the clutch, irrespective of the position of the bar 44 and cam 31. The clutch release is controlled by the operation of the press so as to effect such a release after completion of one cycle of operation. One cycle, as illustrated herein, comprises three stamping operations in succession, to stamp the three openings between the four tines of the fork. Such release is effected by engagement of the lower end of the latch 48 by the end of a horizontal rod 54 extending transversely of the press at the rear thereof and acting against the tension of spring 53. Said rod is moved to clutch-releasing position by the cam 56 engaging the arm 57 fulcrumed to the frame of the press at 58.

The cam 56 makes one revolution for each cycle of the press and is driven by the same source of power 53b from which the press is driven, as will be hereinafter described.

It will thus be observed that the operation of the press will be initiated by the blank feeding device at such time as a blank is fed into the press ready to be operated upon. After the press operation is initiated, it is automatically stopped at the completion of a cycle comprising one complete revolution of the cam 56 and shaft 59 to permit the finished blank to be removed and a new blank fed therein.

The shaft 59 is driven through a spiral gear 60 by a pinion 61. The pinion 61 is driven by a sprocket wheel 62 through the chain 63 connected with the source of power 53b by which the press is driven, herein shown as an electric motor.

*Floating dies*

To permit movement of the dies to their various spaced and angular positions, the slide plate 21 is adapted to slide longitudinally of the bolster plate 12, or crosswise of the work. The slide plate is provided centrally thereof with an undercut annular recess for receiving a corresponding projection 64 carried on the underside of a floating carriage including the die block 65 on which the die holder 66 is mounted for receiving the female die 20. Thus, the die 20 is capable of a combined reciprocating and angular movement by reason of the rotary movement between the block 65 and the slide 21 coupled with the longitudinal movement of the slide 21 with respect to the bolster plate 12. This movement is followed by the male die head 14 and male die 19 which are caused to move with the block 65 through the medium of the posts 15, such movement being permitted by the loose fit of the head 17 by which it is supported from the slide 13 of the press.

Fixed work holder

The blank 23 is held in fixed position, as above mentioned, by the locating plates 67 and 68 slidably supported upon the upper face of the die 20. Said plates have a three point bearing with respect to the blank, as indicated by dotted lines in Fig. 4. They are angularly adjustable by the nut and slot 69 about a pivot 70 mounted upon an extension of the gauge plate 71 which is supported and longitudinally adjusted upon the press frame by the set screw 72. The gauge plate is both laterally and angularly adjusted by the set screws 73, shown in Fig. 4. Thus, the gauge and locating plates are designed for positioning the blank as it is fed to the press and holding it in fixed relation thereto during the several operations of the dies which move as a unit relative thereto. Mounted immediately above the locating plate, there is a stripper plate 74 having the front end thereof curved upwardly to guide the blank thereunder between the locating plates, as shown in Fig. 1.

Positioning of dies

The reciprocating movement of the slide plate 21 upon the bolster plate 12 is effected in the following manner. At one side of the press there is supported a cam housing 75 through which the shaft 59 extends driven from the source of power 53b by the sprocket chain 63. Mounted upon said shaft within the housing, there is a plurality of cams. To distinguish them, they may be termed the right-hand cam 76, the left-hand cam 77 and the centering cam 78. The right-hand cam 76 is designed to move the slide plate both to centering and the extreme right-hand position, whereby the right-hand opening will be stamped in the fork. The left-hand cam 77 is designed to move the slide plate to the extreme left-hand position, whereby the left-hand opening will be stamped. The centering cam 78, acting in conjunction with cam 76, is adapted to accurately center the plate for stamping the center opening in the fork. In centering the dies, the check 76a of cam 76 forces the slide plate 21 to the right until roller 90 on rocker arm 88 engages the centering cam 78 which limits and centers the plate against the tension of the right-hand spring 81.

For this purpose, the slide plate 21 comprises a recess indicated at 79 in which the connecting rod 80 extends. The rod is surrounded by compression springs 81 between which there is provided a collar 82 pinned to the connecting rod. The connecting rod reciprocates the slide plate through the medium of the collar and springs.

The driven end of the rod is pivotally connected to the roller 83 on one end of the bell crank lever 84, positioned to be engaged by the cam 76. Said bell crank lever is pivoted at 85 to the housing so as to rock thereabout. On the other side and end of the bell crank lever there is a roller 86 in position to be engaged by the cam 77.

The cam 76 by its engagement with the roller 83 will move that end of the bell crank lever to the right, as shown in Figs. 4 and 6, imparting a corresponding right-hand movement to the slide plate 21 through the right-hand spring 81. As the roller 83 is released by the cam 76, the cam 77 will move the roller 86 downwardly to swing the bell crank 84 in the opposite direction for drawing the slide plate to the left through the medium of the left-hand spring 81.

For centering the slide plate, it is provided with a connecting rod 87 pivotally connected to a rocker arm 88 fulcrumed on the press at 89, and provided with a roller 90 in position to be engaged by the cam 78. While the slide plate 21 is being forced to the right by the cam 76, the cam 78 will draw it to the left against the tension of the right-hand spring 81, thus bringing it to the proper centered position for stamping the center opening between the two inner tines of the fork.

The extreme right and left positions of the slide plate are controlled by the adjustable limit stops 91 and 92, respectively. Thus, all three laterally spaced positions of the plate are controlled by the above-described cams and limit stops.

For throwing the die block to its various angular positions relative to the slide plate about its pivotal mounting 64, there are mounted on the press at each end of the die block, adjustable rollers 93 and 94 adapted to be engaged by the projections 95 and 96, respectively. The projections 95 and 96 are secured to, and extend laterally from the die block, being provided with inclined roller-engaging faces. On the rear side of the press there are provided stabilizing rollers 97 spring mounted upon the rods 98 for exerting a yielding stabilizing pressure against the rear edge of the block, one on each side of its center.

By means of this arrangement, as the slide plate is moved by the cams to its extreme right-hand position, and before it is arrested in its movement by the stop 91, the inclined edge of the projection 95 engages the adjustable roller 93 which causes a slight swinging action of the die block thereon against the tension of the right-hand roller 97. This slightly angular position of the die block sets the angular relation of the dies to correspond with the desired angular position of the right-hand slot to be formed in the fork. As the slide plate is returned through its center position, whereby the die block is free from engagement with the rollers 93 and 94, the compression rollers 97 under equal tension, will bear against its rear edge, and will straighten it so that the dies will be aligned in position for punching the straight opening between the center tines of the fork. When the slide plate is moved to its extreme left-hand position, the die block will be again tilted by engagement with the roller 94 for stamping the angularly-disposed opening on the left-hand side of the fork in the manner above described with respect to the right-hand side.

Operation

In operation it may be assumed that the usual clutch in a die press of this character is freed so that the press is at rest, but with the die block in substantially central position, and the punch 14 elevated. A blank has just been discharged and a new blank is to be fed to the machine. Thereupon, the feed plate 24 moves the bottom blank 23 from the magazine 22 onto the carriage 26 when in its retracted position with the gripping lever 25 elevated. Through the medium of the shaft 29, the carriage 26 is caused to move forward simultaneously, actuating the gripping lever 25 to grip the rear end of the blank 23.

The continued movement of the carriage inserts the forward end of the blank between the dies within the locating plates 67 and 68.

When the blank has been thus located within the press, the cam 31 causes the clutch to be engaged by pulling down on the rod 53, and the press is set into operation. The first movement of the press causes the centering cam 78, through the bell crank 88, to accurately center the die block, carrying the dies, to stamp the central opening $a$ between the two center tines of the fork as illustrated in Fig. 9. Thereupon the right-hand cam 76 causes the die block to move to the right and be slightly biased by engagement with the roller 93, in which position the right-hand opening $b$ between the right-hand tines is stamped at a slightly angular relation to the center opening as illustrated in Fig. 10. After this operation, the cam 77, through the roller 86, draws the die block to the opposite extreme position where it is reversely biased by engagement with the roller 94. In this position, the left-hand opening $c$ between the left-hand tines of the fork, is stamped at an opposite angle to the right-hand opening as illustrated in Fig. 11.

After the completion of the three stamping operations, the cam 56, through the medium of the rod 54, actuates the latch 48 to release the rod 53 which disconnects the clutch and brings the press to rest, during which time the cam 78 returns the slide plate and die block to substantially the center position and the male die is elevated. The blank 23 is then retracted by the carriage 26, which, upon reaching its rear position, causes the clamping lever 25 to release the blank, permitting it to drop from the machine.

While the invention has been described as pertaining to a particular type of die press, operable for producing a fork, it will be recognized that the same principle of operation, as well as the mechanism affecting the control of the press, positioning of the dies, and locating the work, may be employed with other types of presses and for different purposes. Thus, the invention is applicable to presses wherever it is desirable to effect a plurality of spaced and/or angularly-disposed operations on a piece of work.

The invention claimed is:

1. The process of stamping out a plurality of tines in a fork consisting in locking a blank in fixed position, applying a die to the blank for stamping out the central opening between the inner tines, automatically transferring said die to another position and applying it to the blank for stamping an opening to one side of the central opening to form the tines on one side of the fork, automatically moving said die to the other side of the central opening, and applying it to the blank to stamp out an oppositely disposed opening on the other side of the central opening to provide tines on the other side of the fork.

2. The process of stamping out a plurality of tines in a fork consisting in locking a blank in fixed position, applying a die to the blank for stamping out the central opening between the inner tines, automatically transferring said die to another position and applying it to the blank for stamping an opening to one side of the central opening to form the tines on one side of the fork, automatically moving said die to the other side of the central opening, applying it to the blank to stamp out an oppositely disposed opening on the other side of the central opening to provide tines on the other side of the fork, and varying the angular position of said die for each successive operation for controlling the angular relation of the openings and tines formed thereby.

3. The process of stamping out a plurality of tines in a fork, consisting in locking a blank in fixed position, applying a die to the blank for stamping out an opening therein, automatically reciprocating said die laterally relative to said fixed blank, and applying it to the blank in one position of its movement for stamping an adjacent opening to one side of said first mentioned opening and spaced therefrom to form the tines of a fork.

4. The process of performing a stamping operation consisting in holding the work in fixed position, laterally reciprocating a die relative thereto, and applying said die to the work for a stamping operation thereon at predetermined positions in the path of its movement.

5. The process of performing a stamping operation consisting in holding the work in fixed position, applying a die thereto to perform a stamping operation, thereafter causing the die to be automatically reciprocated laterally a predetermined distance with respect to the work, and again applying it to the work for a stamping operation thereon at the extremity of its movement in one direction.

6. The process of stamping a plurality of blanks, consisting in locking a blank in fixed position, applying a die to the blank for stamping out an opening therein, automatically transferring said die to another position and applying it to the blank for stamping an adjacent opening to one side of the first-mentioned opening and automatically returning said die to its original position preparatory to operating on the succeeding blank.

CHARLES R. MOON.